United States Patent

[11] 3,619,757

| [72] | Inventors | Steven R. Ioerger<br>North Hollywood;<br>Dun H. Nelson, Jr., Sunland; Irvin M.<br>Starr, Granada Hills, all of Calif. |
|---|---|---|
| [21] | Appl. No. | 818,350 |
| [22] | Filed | Apr. 22, 1969 |
| [45] | Patented | Nov. 9, 1971 |
| [73] | Assignee | The Bendix Corporation |

[54] VARIABLE SPEED CLOSED LOOP DIGITAL SERVOSYSTEM
5 Claims, 3 Drawing Figs.

[52] U.S. Cl..................................................... 318/685,
318/138, 318/597
[51] Int. Cl...................................................... G05b 19/40
[50] Field of Search........................................... 318/138,
20.860, 20.230, 20.285, 20.110, 20.400, 571, 597, 611, 685

[56] References Cited
UNITED STATES PATENTS

| 3,368,128 | 2/1968 | Parrish..................... | 318/138 |
| 3,418,547 | 12/1968 | Dudler..................... | 318/138 X |
| 3,443,057 | 5/1969 | Allen et al. ............... | 318/138 X |
| 3,448,362 | 6/1969 | Dorf et al.................. | 318/138 |
| 3,466,517 | 9/1969 | Leenhouts.................. | 318/138 X |

*Primary Examiner*—Benjamin Dobeck
*Attorneys*—Burns, Doane, Benedict, Swecker & Mathis, Robert C. Smith and Plante, Arens, Hartz, Hix and Smith

ABSTRACT: An analog, condition responsive, bidirectional stepper motor position servosystem in which the rate of response is a function of the absolute value of the instantaneous error signal. Clocked gates are utilized in lieu of AND gates to prevent the application of excessive pulses from the VCO to the motor and step integrity is insured by the utilization of a filter circuit at the input to the VCO.

VARIABLE SPEED CLOSED LOOP DIGITAL SERVOSYSTEM

BACKGROUND OF THE INVENTION

The subject invention relates to a closed loop, digital, variable condition responsive, stepper motor position servo system.

Stepper motors are themselves well known in the art. Conventionally, motors of this type are provided with bidirectional windings energized sequentially to provide a discrete increment of angular rotation of the output shaft of the motor for each impulse of electrical energy supplied to the windings. Stepper motors are thus ideally adapted for use with digital control circuits and have countless applications in stepper motor servo systems because of this characteristic.

Due, however, to the inertia of the rotor of the motor and of the load, the conventional stepper motor can be driven quite a bit faster if driven continuously in the same direction than it can be driven bidirectionally, i.e., alternatively clockwise and counterclockwise.

Two basic modes of operation of the conventional stepper motor are thus possible. In the "slew" mode of operation, the operating speed of the motor may be continuously increased above the maximum response step rates. Maximum speed of the motor is, of course, obtained in the slew mode of operation. Sudden stoppage of a slewing stepper motor may, however, cause the shaft position to overshoot the desired position and step integrity with the input signals may be lost. For this reason the impulses of electrical energy are generally applied at rates below the maximum bidirectional response rate of the motor.

The use of voltage controlled oscillators to supply the impulses of electrical energy to selected windings of a stepper motor is today a common expedient in the servo art. In the speed control of synchronous motors, for example, voltage controlled oscillators may generate a series of pulses for comparison with a series of pulses derived from a tachometer generator or the like associated wit the output shaft of the motor. The difference in the frequency or pulse repetition rates of the two signals may be used to adjust the value of the control voltage applied to the voltage controlled oscillator. The speed of the motor may thus be adjusted for coincidence of the two signals. Exemplary systems of this type are illustrated in the Goslin et al. U.S. Pat. No. 3,355,644 and the Valk et al. U.S. Pat. No. 3,312,885.

Voltage controlled oscillators have in addition been used in the machine tool control art for the purpose of establishing feed-rate control. These systems are position control systems, rather than speed control systems, and customarily utilize a plurality of input signals each having a different frequency. The pulse repetition rates of these input signals control the stepping speed of the motor and may selectively be applied thereto in response to variations in the magnitude of a position error signal as compared with predetermined threshold values. An example of such a system is illustrated in the Hallmark U.S. Pat. No. 3,109,974.

Other machine tool control systems, such as that described in the Rado U.S. Pat. No. 3,286,085, provide a control voltage related to the difference between a feedback pulse train having a frequency proportional to motor speed and a feed-rate command pulse train generate by a tape reader or the like.

In all of these prior art machine tool, position control systems, the reference signal is generally supplied by a tape reader or other predetermined program in which the change of position is known throughout any adjustment thereof and a period for slowing down the response of the motor to avoid overshoot of the desired position may be easily incorporated. While this speed increase is desirable in the early part of any substantial change of position, considerable time may generally be devoted in these prior art systems to a slowing down period to prevent overshoot of the desired position. And, since each change in position is quite easily separable from the antecedent and subsequent changes of position, there is no sense of urgency as to time in the completion of one change of position and the beginning of another.

These systems are generally unsuited for use in applications in which the desired or reference signal is responsive to a condition which widely varies within a limited period of time or in which rapid reversals of the direction of position change are required without overshoot.

In distinction, the subject invention has particular utility in the meter movement art wherein the condition sensed may be not only continuously varying, but also changing in direction at which the variations occur. The apparatus of the present invention has the capability of operating with analog desired and actual position signals to control the frequency of the pulses applied to the stepper motor and thus the rate at which the change of position occurs. This rate of stepper motor response is, in the present invention, a function of the instantaneous difference between the desired position of the stepper motor as indicated by condition responsive sensor and the actual position of the motor as may be detected by any conventional detector means.

It is accordingly an object of the present invention to obviate the deficiencies of the prior art position control servo systems and to provide a novel method and apparatus to control the frequency of the impulses of electrical energy applied to the selected windings of a bidirectional stepper motor as a function of the currently sensed error.

It is another object of the present invention to provide a novel method and apparatus whereby a digital stepper motor may be adapted to control the stylus of a condition responsive recording meter in which the condition sensed varies at a substantial rate with rapid reversals and in which the total change of position is unknown as the motor commences its response.

It is still another object of the present invention to provide a novel method and apparatus for utilizing the comparison of analog signals to control the frequency or recurrence rate of the electrical impulses applied to a stepper motor in a closed loop, digital servo system.

It is yet another object of the present invention to provide a novel method and apparatus in which the impulses of electrical energy from a voltage controlled oscillator are selectively applied to the windings of a stepper motor through gating circuitry clocked to insure that all of the motor driving impulses commence at the beginning of the clock period. The number of applied impulses in a given unit of time may thus be reduced thereby increasing the accuracy of the indication of the desired rate of response.

It is a further object of the present invention to provide a novel method and apparatus in which the rate at which the frequency of the electrical impulses applied to the stepper motor windings may be limited to prevent the resonance or loss of step integrity thereof, i.e., vibration of the rotor without stepping.

It is yet a further object of the present invention to provide a novel method and apparatus in which not only is the selection of the "slew" and bidirectional stepping modes of operation of the motor, but the speed of response at all times is controlled as a function of the absolute value of the difference between the desired and actual position of the stepper motor output shaft. Rapid response may thus be achieved with minimum overshooting in response to sudden stops or reversals of the position error signal.

These and other objects and advantages of the present invention will be readily apparent to one skilled in the art to which the invention pertains from a perusal of the following detailed description of a preferred embodiment in conjunction with the appended drawings.

THE DRAWINGS

DETAILED DESCRIPTION OF A PREFERRED EMBODIMENT

Figure 1:
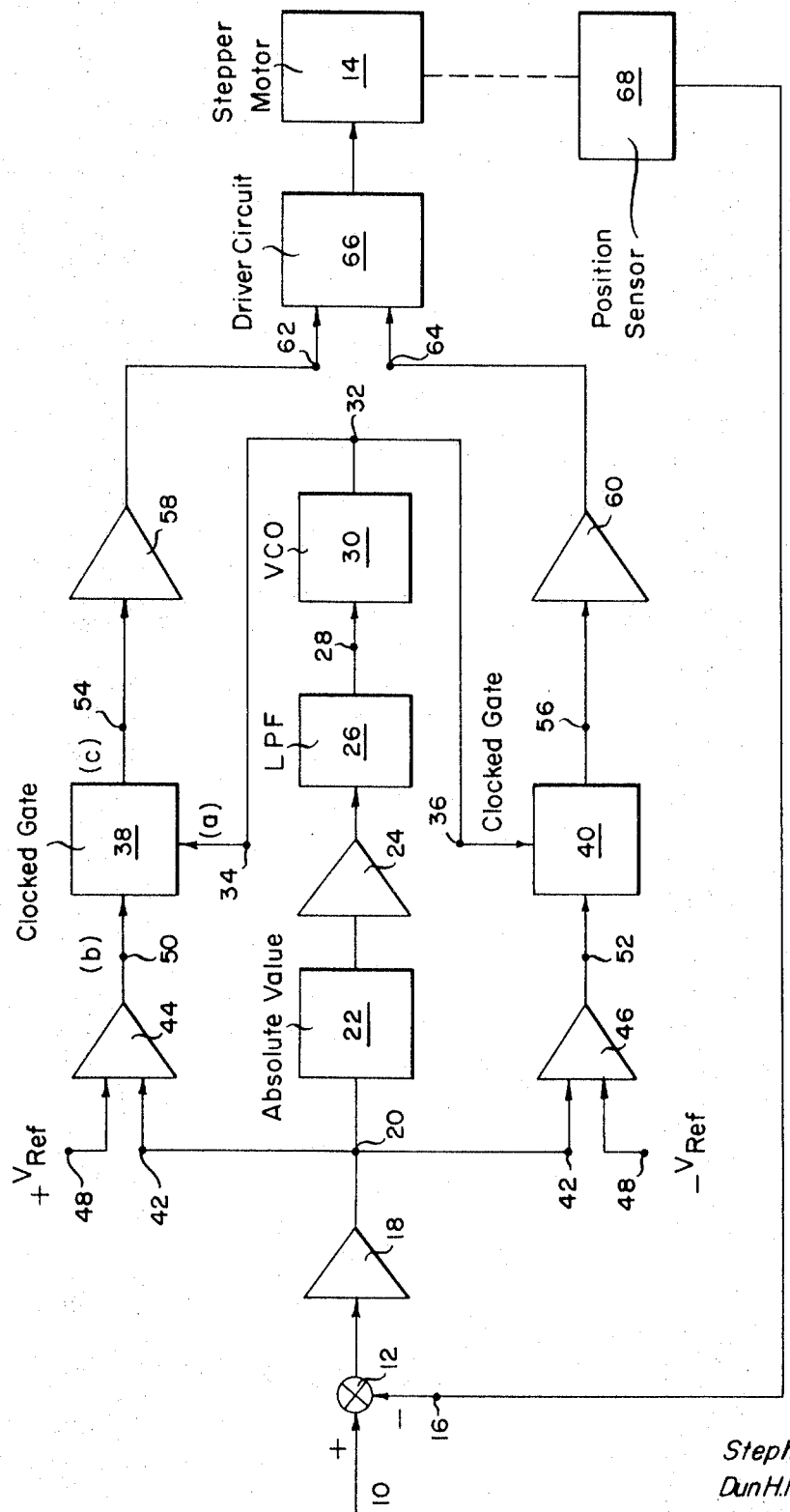
FIG. 1 is a schematic block diagram of the closed loop, digital, position servo system of the present invention.

With reference to the block diagram of FIG. 1, an analog input signal may be derived from a conventional condition responsive means (not shown). This desired position indicating signal may be applied as a positive reference to one input terminal 10 of a subtraction circuit 12. An analog signal related to the actual position of the output shaft of the stepper motor 14 may be applied in the opposite sense, i.e., as a negative signal, to the subtraction circuit 12 by way of a second input terminal 16.

The subtraction circuit 12 may be a conventional differential amplifier or any other well known circuit designed to provide an analog output or error signal related in amplitude to the difference between the amplitudes of two analog input signals applied respectively to the input terminals 10 and 16. The polarity of the error signal will be that of the input signal having the greatest amplitude and will then identify the direction of rotation of the motor shaft necessary to reduce the error signal to zero.

The output signal of the subtractor circuit 12 may be applied through a conventional amplifier 18 to the input terminal 20 of an absolute value determining circuit 22. The absolute value determining circuit 22 operates in a conventional manner to provide an analog output signal having a predetermined polarity irrespective of the polarity of the signal applied to the input terminal 20 thereof. The amplitude of the output signal of the absolute value determining circuit 22 is, of course, related to the amplitude of the input signal irrespective of the polarity thereof.

Absolute value circuits of this type are well known in the art and may, for example, be of the type illustrated and described in paragraph II. 42 on pages 58 and 59 of the Philbrick Applications Manual Computing Amplifiers, copyright 1966 by George A. Philbrick Researchers, Inc.

The input signal from the absolute value circuit 22 may be applied through a conventional amplifier 24 and low pass filter circuit 26 to an input terminal 28 of a voltage controlled oscillator which may be conventional in circuitry and operation. The signal taken from the output terminal 32 of the voltage controlled oscillator 30 comprises a series of impulses of electrical energy having a pulse repetition rate or frequency related to the amplitude of the signal applied to the input terminal 28. The output terminal 32 of the voltage controlled oscillator is directly connected to the input terminals 34 and 36, respectively, of a pair of clocked gates 38 and 40 hereinafter to be described in connection with FIG. 2.

The analog output signal of the amplifier 18 is applied, not only to the absolute value determining circuit 22, but also to one input terminal 42 of each of a pair of threshold devices 44 and 46 to which positive and negative reference voltages are respectively applied by way of a second input terminal 48. The output terminal of the threshold detector 44 may be directly connected to the control terminal 50 of the clocked gate 38. The output terminal of the threshold detector 46 may similarly be connected to the control terminal 52 of the clocked gate 40.

The output terminals 54 and 56 respectively of the clocked gates 38 and 40 may be connected by way of conventional amplifiers 58 and 60 to one of the input terminals 62 and 64 of the driver circuit 66 which selectively energizes the bidirectional windings of the stepper motor 14.

The angular position of the output shaft of the stepper motor 14 may be sensed by a conventional followup potentiometer 68 or other well known position sensor. The position sensor 68 provides the analog signal applied the second input terminal 16 of the error signal generating subtractor circuit 12.

In operation, the analog error signal represents the difference between the amplitude of the condition responsive analog input signal applied to the terminal 10 of the subtractor circuit 12 and the analog input signal derived from the position sensor 68 indicative of the angular position of the output shaft of the stepper motor 14 and applied to the terminal 16. This error signal is amplified and applied to absolute value circuit 22. The constant polarity output signal from the absolute value circuit 22 is amplified, filtered and applied to the input of terminal 28 of the voltage controlled oscillator 30.

The low pass filter circuit 26 operates to limit the rate of change in the amplitude of the signal applied to the voltage controlled oscillator 30 thereby limiting the rate of change in the pulse repetition rate or frequency of the pulses in the output signal therefrom. An increase in the frequency of the output signal from the voltage controlled oscillator 30 above the maximum rate of acceleration of the motor 14 may cause the stepper motor 14 to vibrate or resonate without stepping.

The amplified difference or error signal applied to the absolute value circuit 22 is also applied to the threshold detectors 44 and 46. When the predetermined value of the reference voltage of the threshold detector is exceeded, an output signal will be applied to the appropriate control terminal 50 or 52 to enable the associated clocked gate 38 or 40. The pulses in the output signal from the voltage controlled oscillator 30 will be passed through the enabled one of the clocked gates 38 and 40, amplified and applied to the appropriate one of the input terminals 62 and 64 of the driver circuit 66.

Figure 2:
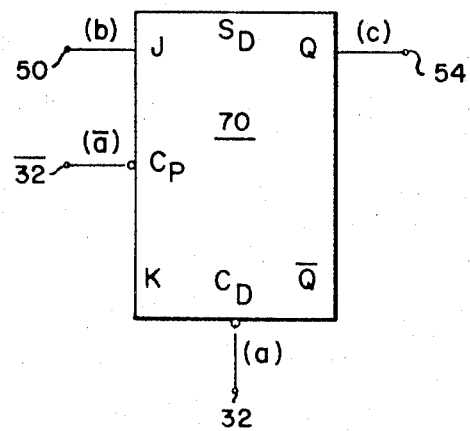
FIG. 2 is a schematic drawing of a clocked gates of the circuit of FIG. 1.

The clocked gates 38 and 40 are conventional in their operation and may be, for example, of the type illustrated in FIG. 2. With reference to FIG. 2, a simple J-K flip-flop 70 is illustrated as having input terminals J and K, a direct clear input terminal $C_D$, a clock input terminal $C_P$, a set input terminal $S_D$, and complementary output terminals Q and $\bar{Q}$. The terminals J, $C_P$, $C_D$, and Q have been given numerical designations 50, 32, and $\bar{32}$ and 54, respectively corresponding to the like numbered terminals of the block diagram of FIG. 1 to facilitate an understanding of the connection thereto. The signal applied to the terminal $\bar{32}$ represents, of course, the complement of the output signal of the voltage controlled oscillator 30 as it appears on the output terminal 32 of the voltage controlled oscillator 30.

Figure 3:
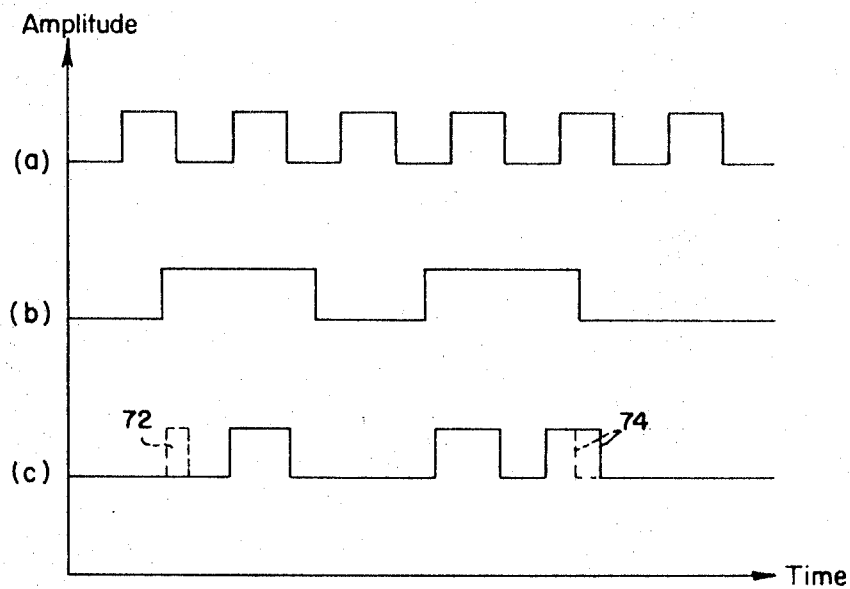
FIG. 3 is a graph illustrating the method and operation of the clocked gates of the block diagram of FIG. 1.

The function and operation of the clocked gates 38 and 40 may be more easily explained in connection with the waveform of FIG. 3. With reference now to FIG. 3, waveform (*1*) illustrates the generally rectangular impulses appearing in the signal at the output terminal 32 of the voltage controlled oscillator 30 of FIG. 1. Waveform (*b*) illustrates, by way of example, the output signal from the positive reference voltage threshold detector 44 of FIG. 1 and waveform (*c*) illustrates the pulses of the output signal of the voltage controlled oscillator, waveform (*a*), which are passed through the clocked gate 38 amplified and applied to the input terminal 62 of the driver circuit 66.

The use of a conventional AND gate in lieu of the clocked gates 38 and 40 would provide a pulse coextensive with the coexistence of positive or binary ONE signals in waveforms (*a*) and (*b*). As illustrated in phantom in waveform (*c*) of FIG. 3, an additional pulse, indicated at 72, would be provided where the waveforms (*a*) and (*b*) are both positive or binary ONES's. This additional pulse 72 would result in driving the stepper motor 14 at a rate faster than that desired as indicated by the error signal. By utilization of the clocked gate described supra, the pulses of waveform (*c*), i.e., the pulses of waveform (*a*) passed through the clocked gate, are restricted to those pulses in waveform (*a*) which are initiated after the enabling of the clocked gate since the signal or the output terminal Q will change state only when the signal on the clock input terminal $C_P$ is going negative. While some pulses of waveform (*a*) are passed through the clocked gate 38 which are not, in their entirety, coextensive with the coincidence of the waveforms (*a*) and (*b*), the number of additional pulses is greatly reduced and the pulse rate of the signal of waveform (*c*) cannot exceed that of either waveform (*a*) or waveform (*b*). This latter pulse 74 indicated in phantom in waveform (*c*) would, of course, trigger the driver circuit 66 even though of shorter duration than the pulses in waveform (*a*).

It is clear from the foregoing that the circuit of the present invention is operable to derive a position error signal related to the difference between the desired and actual angular position of the output shaft of a stepper motor, to generate pulses at a frequency related to the absolute value of the error signal, and to apply only those generated pulses to the motor during periods of time in which the error signal exceeds predetermined values. By means of the foregoing, the speed or response of the stepper motor is related to the instantaneous value of the error signal and the system is thus particularly adapted for driving the stylus of a condition responsive recorder. Overshoot is reduced by the decrease in the frequency of the applied pulses as the error signal is reduced while the speed of response is maintained quite high where substantial movement is required due to rapid fluctuations in the condition responsive input signal. The filter circuit limits the rate of increase in the frequency of the applied pulses to prevent exceeding the maximum acceleration rate of the motor and loss of step integrity. Excessive response is prevented by the utilization of clocked gates.

While the novel method and circuitry of the present invention has been described in connection with a preferred embodiment, the invention may, of course, be incorporated in other embodiments without departing from the scope thereof as defined, with a full range of equivalents, in the appended claims.

We claim:

1. A variable speed closed loop digital servo system comprising:
   an electrical stepper motor having an output shaft;
   means for deriving a first analog electrical signal related to the instantaneous angular position of said shaft;
   means for generating a second analog electrical signal related to the desired instantaneous angular position of said shaft;
   means for generating an analog electrical error signal continuously related to the difference in amplitude between said first and said second electrical signals;
   means for generating a series of electrical pulses having a rate of recurrence continuously related to the amplitude of said analog error signal;
   circuit means for applying a driving pulse to said stepper motor in response to each pulse in said series of electrical pulses whereby the rate of change in the angular position of the shaft of said stepper motor is continuously related to the amplitude of said analog error signal; and
   low pass filter means connected to said electrical pulse generating means for limiting the rate of increase in the recurrence rate of the pulse in said series of electrical pulses to thereby reduce the tendency of said motor to oscillate in response to an abrupt increase in the recurrence rate of the pulses in said series of electrical pulses.

2. A variable speed closed loop digital servo system comprising:
   an electrical stepper motor having an output shaft;
   means for deriving a first analog electrical signal related to the instantaneous angular position of said shaft;
   means for generating a second analog electrical signal related to the desired instantaneous angular position of said shaft;
   means for generating an analog electrical error signal continuously related to the difference in amplitude between said first and said second electrical signals;
   means for generating a series of electrical pulses having a rate of recurrence continuously related to the amplitude of said analog error signal;
   circuit means for applying a driving pulse to said stepper motor in response to each pulse in said series of electrical pulses whereby the rate of change in the angular position of the shaft of said stepper motor is continuously related to the amplitude of said
   first gate means interconnected between said pulse generating means and said circuit means for passing pulses in said series of electrical pulses from said pulse generating means to said circuit means when enabled and for otherwise blocking the passage of pulses in said series of electrical pulses; and
   means responsive to the amplitude of said error signal for enabling said gate means.

4. The servo system of claim 2 including a second gate means connected between said pulse generating means and said circuit means for passing pulses in said series of electrical pulses to said circuit means when enabled and for otherwise blocking the passage of pulses in said series of electrical pulses; and
   first and second threshold comparators connected one each between said error signal generating means and said first and second gate means respectively, said first comparator enabling said first gate means in response to error signals of one polarity having an amplitude greater than a predetermined value, said second comparator enabling said second gate means in response to error signals of the other polarity having an amplitude greater than a predetermined value;
   and wherein circuit means includes means for driving said stepper motor to change the position of said shaft in one direction in response to a pulse from said first gate means and for driving said stepper motor to change the position of said shaft in the opposite direction in response to a pulse from said second gate means.

5. A variable speed closed loop digital servo system comprising:
   an electrical stepper motor having an output shaft;
   means for deriving a first analog electrical signal related to the instantaneous angular position of said shaft;
   means for generating a second analog electrical signal related to the desired instantaneous angular position of said shaft;
   means for generating an analog electrical error signal continuously related to the difference in amplitude between said first and said second electrical signals;
   means for generating a series of electrical pulses having a rate of recurrence continuously related to the amplitude of said analog error signal;
   circuit means for applying a driving pulse to said stepper motor in response to each pulse in said series of electrical pulses whereby the rate of change in the angular position of the shaft of said stepper motor is continuously related to the amplitude of said analog error signal;
   absolute value means connected between said error signal generating means and said pulse generating means for deriving the absolute value of said instantaneous error signal whereby said pulse generating means is nonresponsive to the polarity of said error signal; and
   low-pass filter means connected between said absolute value means and said pulse generating means for limiting the rate of change of the analog signal applied to said pulse generating means.

* * * * *